United States Patent
Lal et al.

(10) Patent No.: US 7,590,306 B2
(45) Date of Patent: Sep. 15, 2009

(54) RESOLUTION ADAPTIVE IMAGE FILTERING SYSTEM AND METHOD

(75) Inventors: Rakesh Mohan Lal, Waukesha, WI (US); David C. Mack, Waukesha, WI (US); Gopal B. Avinash, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 1024 days.

(21) Appl. No.: 10/723,791

(22) Filed: Nov. 26, 2003

(65) Prior Publication Data
US 2005/0111760 A1 May 26, 2005

(51) Int. Cl.
G06K 9/32 (2006.01)
G06K 9/40 (2006.01)
(52) U.S. Cl. .................... 382/298; 382/261; 382/275
(58) Field of Classification Search .............. 382/198, 382/275, 276, 298, 299, 131, 162, 261
See application file for complete search history.

(56) References Cited

U.S. PATENT DOCUMENTS

| | | | | |
|---|---|---|---|---|
| 5,253,192 | A * | 10/1993 | Tufts ....................... 708/403 |
| 5,943,433 | A * | 8/1999 | Avinash .................... 382/131 |
| 6,015,385 | A * | 1/2000 | Finger et al. ................ 600/443 |
| 6,061,477 | A * | 5/2000 | Lohmeyer et al. ........... 382/300 |
| 6,178,220 | B1 * | 1/2001 | Freundlich et al. ............ 378/4 |
| 6,248,988 | B1 * | 6/2001 | Krantz .................... 250/201.3 |
| 6,340,994 | B1 * | 1/2002 | Margulis et al. ........... 348/625 |
| 6,377,162 | B1 * | 4/2002 | Delestienne et al. ... 340/286.07 |
| 6,748,098 | B1 * | 6/2004 | Rosenfeld .................. 382/131 |
| 6,886,034 | B2 * | 4/2005 | Blumberg .................. 709/217 |
| 6,973,210 | B1 * | 12/2005 | Platt et al. .................. 382/162 |
| 7,254,199 | B1 * | 8/2007 | Desloge ..................... 375/350 |
| 2002/0130875 | A1 * | 9/2002 | Blackham et al. ........... 345/545 |
| 2004/0032990 | A1 * | 2/2004 | Okada et al. ................ 382/260 |

* cited by examiner

Primary Examiner—John Strege
(74) Attorney, Agent, or Firm—Fletcher Yoder

(57) ABSTRACT

A technique is provided for improving digital images by analysis of the sampling rate of the image data. The optimal sampling rate is determined, such as based on the point-spread function of the imaging system, and is compared to the actual pixel sampling rate. Based upon the comparison, the image may be shrunk or sub-sampled to provide the optimal sampling rate that allows for optimal image filtering while accounting for inherent variations in spatial resolution of the images.

22 Claims, 3 Drawing Sheets

RESOLUTION ADAPTIVE IMAGE FILTERING SYSTEM AND METHOD

BACKGROUND OF THE INVENTION

The present invention relates to the field of digital imaging and image enhancement. More particularly, the invention relates to a technique for improving image enhancement by appropriately filtering input image data based upon an optimal sampling rate for the data.

Many techniques are currently available and in use for creating digital images. The techniques range in complexity from simple photographic techniques to much more complex imaging modalities such as those used in medical imaging, part inspection, parcel and baggage inspection, and so forth. More complex imaging modalities include computed tomography (CT) imaging systems, magnetic resonance imaging (MRI) systems, digital X-ray imaging systems, and so forth. In all of these applications there is a continuing need for improvement of the resolution and clarity of images produced. Generally speaking, these improvements are made in post-processing steps in which the image data is manipulated through various calculations to enhance the clarity and general usefulness of the final reconstructed image.

Current imaging systems produce images of differing spatial resolutions. A parameter known as the point-spread function of the systems is largely dependent upon imaging parameters, and results in such differing spatial resolutions. In CT images, for example, the particular reconstruction algorithm used to convert the acquired data to image data primarily determines the extent of the point-spread function. In MRI systems, similarly, the amount of zero-filled interpolation in the k-space data (the data acquired during an imaging sequence) affects the spatial extent of the point-spread function. In X-ray systems, the distance between the source and detector determines the point-spread function of the system.

Image filtering algorithms aimed at removing random noise from images do not currently account for this variation in the inherent spatial resolution. Accordingly, such algorithms perform sub-optimally in terms of image quality. In such frameworks, a loss of spatial resolution in the filtered image often results, even as they may successfully reduce levels of random noise.

There is a need, therefore, for an improved technique for filtering digital images. There is, at present, a particular need for a technique that can be used in different contexts and to account for a different point-spread function bases.

BRIEF DESCRIPTION OF THE INVENTION

The present invention provides a novel technique to image enhancement designed to respond to such needs. The technique is based upon an image filtering algorithm that reduces noise levels in the image without sacrificing spatial resolution of the filtered image. The technique automatically adapts to the variations in the intrinsic spatial resolution of the image being filtered. In particular, the technique determines an optimal sampling rate, such as from the point-spread function of the image. It is also possible to estimate the point spread function by examining the bandwidth properties of the image. This optimal sampling rate is compared to an actual pixel sampling rate. Based upon the comparison, during filtering, the image can be shrunk accordingly to accommodate the optimal sampling rate. Alternatively, re-sampling of the data may be done in certain context.

The invention contemplates methods, systems and computer programs designed to implement such techniques.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
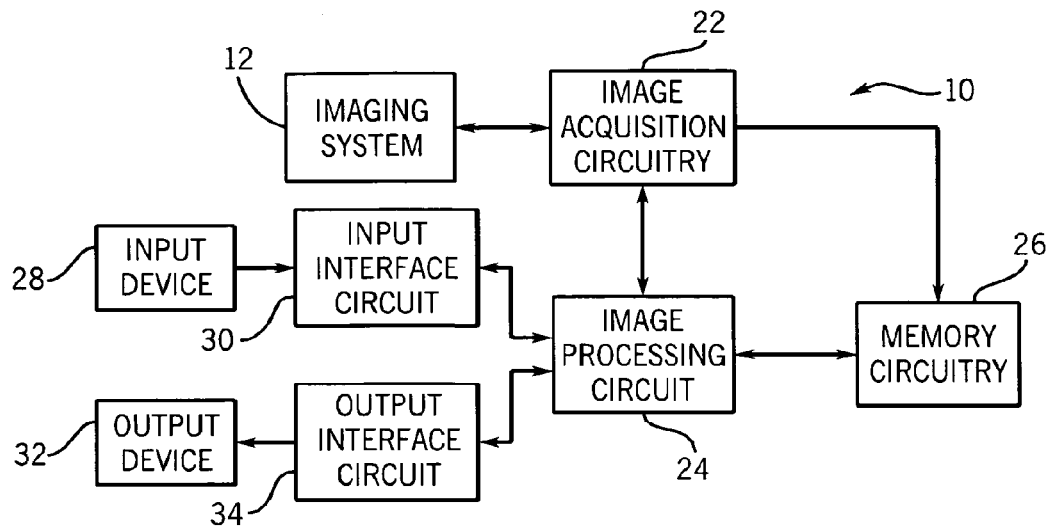
FIG. 1 is a diagrammatical representation of an exemplary imaging system adapted to provide resolution adaptive image filtering in accordance with the present techniques.

Referring to FIG. 1, an imaging system 10 is depicted as including a scanner or data acquisition system 12 coupled to circuitry for acquiring and processing discrete pixel data. Signals sensed by the system 12 are encoded to provide digital values representative of the signals associated with specific locations on or in the subject, and are transmitted to the image acquisition circuitry 22. The image acquisition circuitry 22 also provides control signals for configuration and coordination of system operation during image acquisition. The image acquisition circuitry 22 transmits the encoded image signals to an image processing circuit 24. The image processing circuit 24 executes pre-established control logic routines stored within a memory circuit 26 to filter and condition the signals received from the image acquisition circuitry 22 to provide digital values representative of each pixel in the acquired image. These values are then stored in the memory circuit 26 for subsequent processing and display. Alternately, the image acquisition circuitry 22 may transmit the encoded image signals to the memory circuit 26. The image processing circuit 24 may subsequently acquire the signals from the memory circuit 26 for the filtering and conditioning steps described below.

The image processing circuit 24 receives configuration and control commands from an input device 28 via an input interface circuit 30. The input device 28 will typically include an operator's station, keyboard and other input devices for selectively inputting configuration parameters and for commanding specific image acquisition sequences. The image processing circuit 24 is also coupled to an output device 32 via an output interface circuit 34. The output device 32 will typically include a monitor or printer for viewing and producing reconstructed images based upon the image enhancement processing carried out by the processing circuit 24.

In the embodiment described, the image processing circuit 24, the memory circuit 26, and the input and output interface circuits 30 and 34 are included in a programmed digital computer. However, circuitry for carrying out the techniques described herein may be configured as appropriate coding in application-specific microprocessors, analog circuitry, or a combination of digital and analog circuitry.

It should be noted that imaging system 12 may include any suitable type of imaging system or modality. For example, in a medical diagnostics imaging context, industrial contexts, parcel and baggage inspection and handling contexts, the system may include a CT imaging station. Similarly, the system may include an MRI system, an X-ray system, or any other suitable modality. Other modalities presently contemplated may include tomosythesis systems, positron emission tomography systems, electron beam systems, ultrasound systems, among others. As summarized below, all of the various systems will produce digital data which can be filtered and enhanced in accordance with the present techniques. It should also be noted that, while references made hereinto processing within the imaging system, many of the techniques described herein can and will be applied in post-processing steps. That is, the processing may be carried out in real time or in near real time with image acquisition, or after acquisition and storage of image data. Thus, the image filtering and enhancement techniques described herein may be carried out remotely from the imaging system, as on completely separate and independent workstations that access the image data, either raw, processed or partially processed and perform the steps and functions described herein to improve the ultimate reconstructed image.

Figure 2:
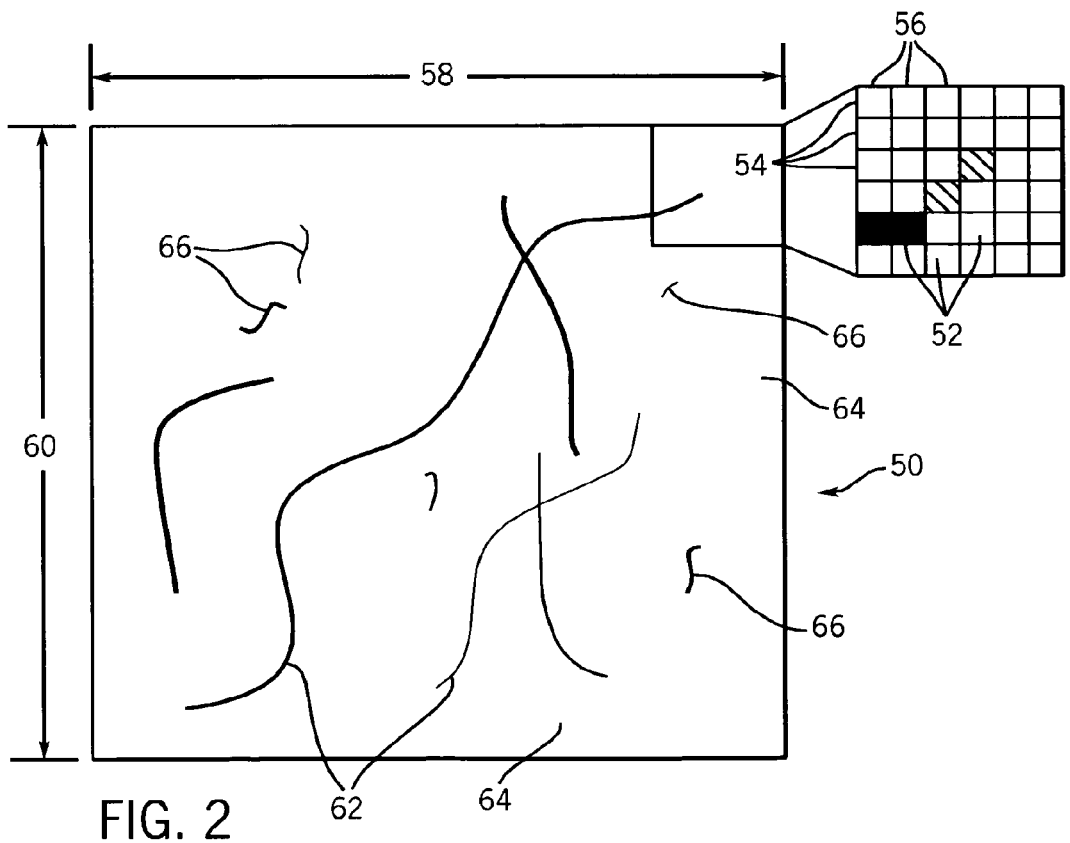
FIG. 2 is a diagram of an exemplary discrete pixel image made up of a matrix of pixels having varying intensities defining structures and non-structures to be enhanced by the present techniques.

FIG. 2 illustrates an exemplary discrete pixel image 50 produced via the imaging system 10. The image 50 is composed of a matrix of discrete pixels 52 disposed adjacent to one another in a series of rows 54 and columns 56. These rows and columns of pixels provide a pre-established matrix width 58 and matrix height 60. Typical matrix dimensions may include 256×256 pixels; 512×512 pixels; 1,024×1,024 pixels, to name just a few. In certain systems the particular image matrix size may be selected via input device 28 (see FIG. 1) and may vary depending upon such factors as the subject to be imaged the resolution desired and the physics or characteristics of the imaging system.

As illustrated in FIG. 2, the exemplary image 50 includes structural regions 62, illustrated as consisting of long, contiguous lines defined by adjacent pixels. The image 50 also includes non-structural regions 64 lying outside of the structural regions 62. The image 50 may also include isolated artifacts 66 of various sizes (i.e., number of adjacent pixels), which may be defined as structural regions, or which may be eliminated from the definition of structure in accordance with generally known techniques. It should be noted that while reference is made in the following discussion to intensity values within an image, such as the exemplary image 50, the present technique may also be used to process other parameters encoded for the individual pixels 52 of an image. Such parameters might include frequency or color, and not merely intensity.

In accordance with the present techniques, the acquired or processed image data forms what may be referred to as an input image. It should be understood that this input image, and other images referred to herein, are actually image data processed by the present techniques. The ultimate reconstructed image is, however, a visual presentation that can be viewed by a user. The present technique allows for manipulation of the input image to account for the particular point-spread function of the imaging system. That is, the technique is spatially adaptive to the characteristics of the imaging system that produced the input image. Known algorithms for image filtering apply sets of spatial domain operations to reduce noise levels in the input image. Certain techniques perform such operations by shrinking the input image, in an operation that may be referred to as sub-sampling. This shrinking operation has the affect of normalizing the input resolution and makes use of redundancies in the input image. Previous techniques have, however, relied upon the image size to determine the degree of shrinking or sub-sampling. The present technique employs a more rigorous approach in which the amount of sub-sampling done to shrink the input image depends upon the intrinsic spatial resolution of the image. In the present context, it may be considered that the inherent spatial resolution may depend on the point-spread function of the imaging system acquiring the image data and the sampling rate used to generate the discrete image. As described below, such information is used to determine the optimal sampling rate, which may be defined as the Nyquist rate of the imaging system. This value is used to determine the amount of sub-sampling or shrinking that is to be performed on the image prior to applying the spatial domain operations. The approach ensures that the optimal sampling criteria are not violated by under-sampling and that the maximum amount of sampling can be attained without loss of image information to perform filtering on the image with normalized resolution and to exploit redundancies in the image data.

Figure 3:
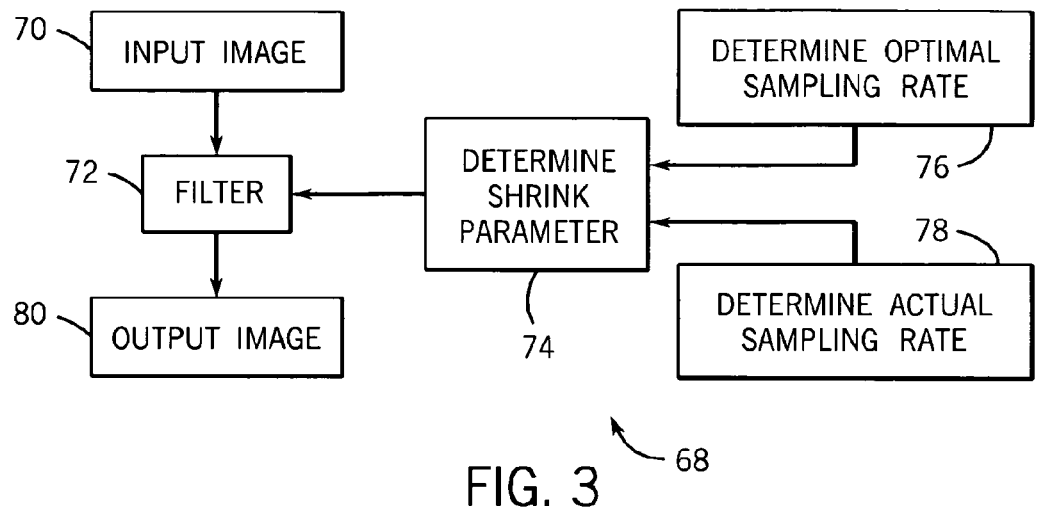
FIG. 3 is a diagrammatical representation of certain functional components of a system for providing resolution adaptive image filtering in accordance with the present techniques.

FIG. 3 represents a diagrammatical representation of a system for performing the functions of the present technique. The system, designated generally by reference numeral 68, may be implemented through hardware, software, firmware or a combination of these media. The system begins with an input image 70 produced by any suitable imaging system. The input image is typically stored on a digital storage device and is accessed by the processing system for enhancement and improvement of the image quality. The system includes a filter 72 which is typically embodied in appropriate software code stored in the system. Certain aspects of the filter may follow generally known techniques as described further below. The filter makes use of shrinking or sub-sampling levels which are determined by a shrink parameter determining module 74. This module, in turn, receives inputs from an optimal sampling rate determining module 76 and an actual sampling rate determining module 78. As described below, based upon the optimal and actual sampling rates, the appropriate shrink parameter or sub-sampling level is determined and provided to filter 72. The filter then produces an output image 80 which includes data that can be reconstructed into an enhanced image for viewing, storing, transmitting, and subsequent processing.

Figure 4:
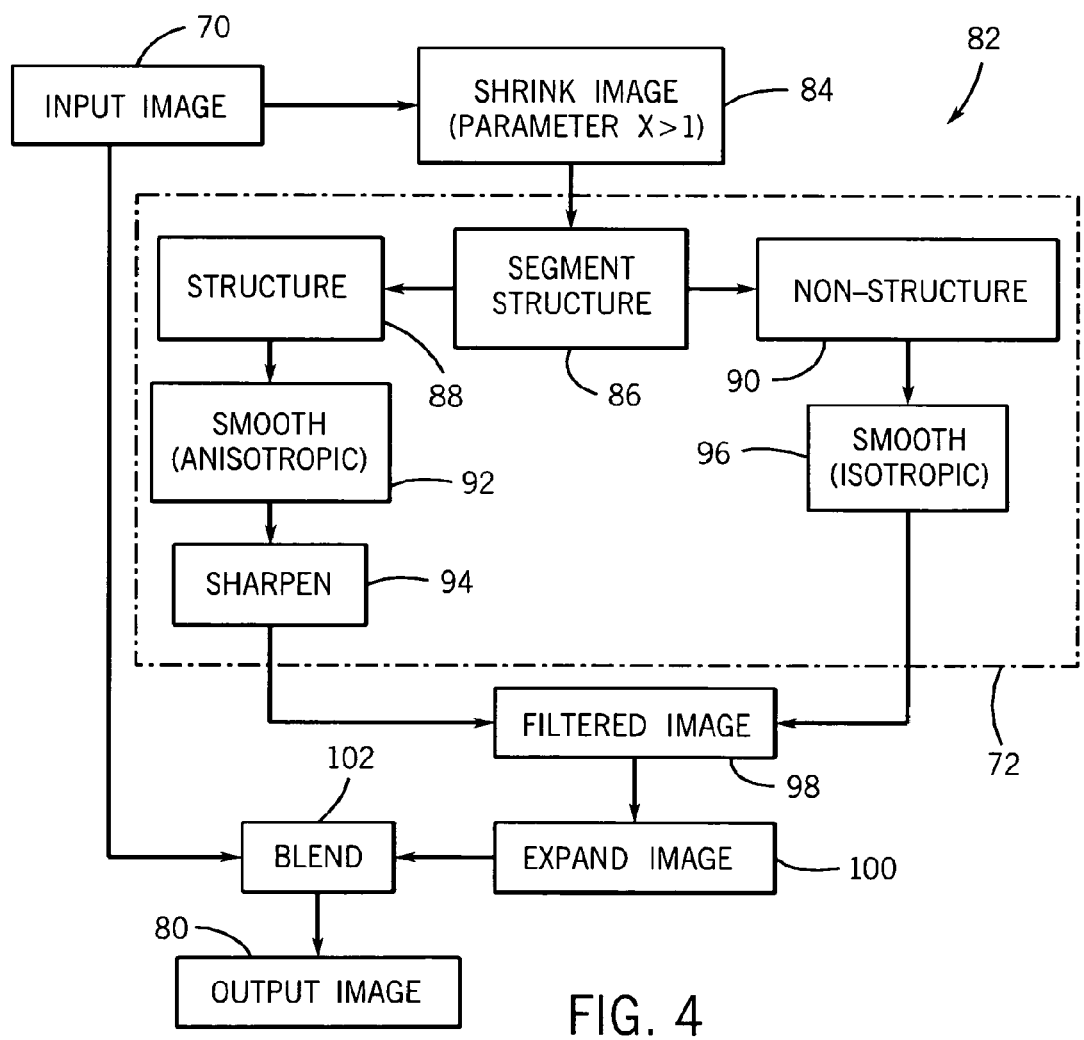
FIG. 4 is a more detailed representation of an implementation of the system of FIG. 3.

As noted, certain elements of the filter 72 may follow lines generally known in the art. FIG. 4 represents certain of these known elements, but with enhanced components incorporating the present techniques. The implementing system, designated generally by reference numeral 82, begins with the input image 70 as noted above. At a step 84 the system shrinks the input image, or sub-samples the input image by a shrink parameter. As will be appreciated by those skilled in the art, such shrinking may be accomplished by various sub-sampling techniques, including a pixel averaging, in which the digital values representative of intensities at each pixel are read and the image is shrunk by some factor X which is generally greater than 1. In a present embodiment, a 2×2 or 3×3 boxcar filter may be applied to obtain a non-overlapping average. Multi-dimensional factors may also be employed, such as 2×3 or 3×2 filters. A multi-dimensional factor must be greater than 1 in at least on of the dimensions, such as 3×1 or 1×3. To obtain non-overlapping averages, the pixels of the image may be mirrored at the boundaries when needed.

The filter 72 serves to identify and process structural features of the input image and non-structural features or regions. Thus, at block 86 of FIG. 4, routines are performed for identifying structures 88 within the normalized image, and differentiating such structures from non-structures 90. The structures are then processed by anisotropic smoothing as indicated at block 92, followed by sharpening, as indicated at block 94. The non-structure, on the other hand, is processed by isotropic smoothing, as indicated at block 96. The processed structure and non-structure then forms a filtered image, as indicated at reference numeral 98 in FIG. 4.

At block 100, the structure and non-structure data is expanded by the same factor by which the image was shrunk or sub-sampled at block 84. The resulting expansion produces an expanded structure mask and an expanded image, both of which have the same dimensions as the input image. At block 102, then, texture present in the input image is blended back into the expanded image to produce the output image 80. The blending process typically utilizes the expanded structure mask to allow differential texture blending of structure and non-structure regions.

It should be noted, and will be appreciated by those skilled in the art, that the exemplary steps and components of FIG. 4 are exemplary only. That is, other, different or additional modules and steps may be incorporated. By way of example, additional blending may occur in which high frequencies are differentially introduced into the blended image to produce a noise blended image. Certain of these techniques can further enhance image quality. The present techniques add to these and permit further enhancement of image quality as will be described.

As will be appreciated by those skilled in the art, depending upon the imaging modality, the point-spread function could be determined from various parameters which may be stored in a header section of an image data stream. For example, in CT images, the reconstruction algorithm employed primarily determines the point-spread function of the imaging system. Because there are a finite number of reconstruction algorithms used in CT, it is possible to determine the point-spread function empirically that is associated with each reconstruction algorithm. Such associations may be placed in a look-up table and used within the present processing framework. For MRI systems, the point-spread functions is determined by the ZIP parameter which defines the highest frequency content of any image generated from the system. Given the highest frequency content in the image, there are numerous methods in standard Fourier theory to determine the point-spread function of the imaging system. In X-ray systems, the point-spread function can be computed from the source-to-detector distance and the source size. This information is also available, generally in the X-ray digital image data stream header. Thus, each type of imaging system generally has available techniques which permit identification of the point-spread functions.

Figure 5:
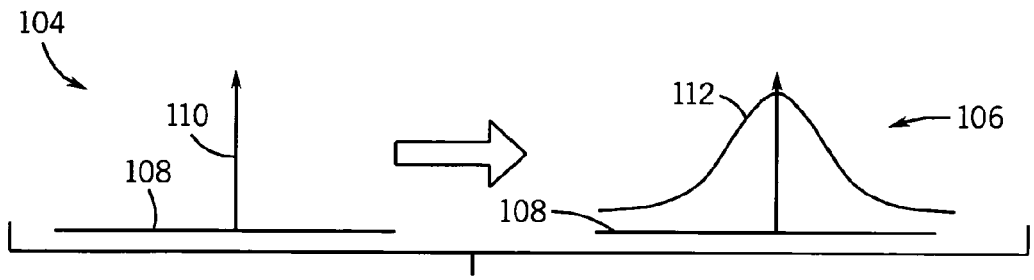
FIG. 5 is a graphical representation of the affects of imaging systems on idealized points providing a point-spread function which is accommodated by the present techniques.

An exemplary illustration of the point-spread function is illustrated in FIG. 5. As shown in FIG. 5, the ideal situation 104 can be illustrated graphically, while the point-spread representation 106 is typically encountered in the actual implementation. With the image pixel dimensions generally represented by the horizontal axis 108 in FIG. 5, and pixel intensity indicated by the vertical axis, in an ideal situation each point is infinitely thin as indicated by reference numeral 110 in FIG. 5. However, due to the inherent limitations of the imaging systems, blurring occurs, resulting in a spread of the pixel dimensions, as indicated by trace 112 in FIG. 5. The present technique recognizes that when sampled at approximately twice the Nyquist rate, information loss can be substantially avoided. The Nyquist rate can be determined by taking the Fourier transform of the point-spread function. Alternatively, the Nyquist rate can be computed using standard image processing techniques, by examining the highest frequency harmonic in the image. Note however that even though this approach is useful, as it does not rely on system and acquisition parameters, it is quite susceptible to noise in the image. In practice, if the point-spread function is wide, the image may be quite blurred in appearance, requiring a higher degree of shrinking or sub-sampling in the processing steps described above. Moreover, the display field is generally considered, that is, the dimension of objects in the reconstructed image. A redundancy metric is determined based upon the display field as described below. That is, if many pixels are required to represent an object in the reconstructed image, this fact implies a high degree of redundancy, and the input image may be shrunk a considerable degree. Thus, the degree of shrinking or sub-sampling also depends upon this redundancy metric.

Figure 6:
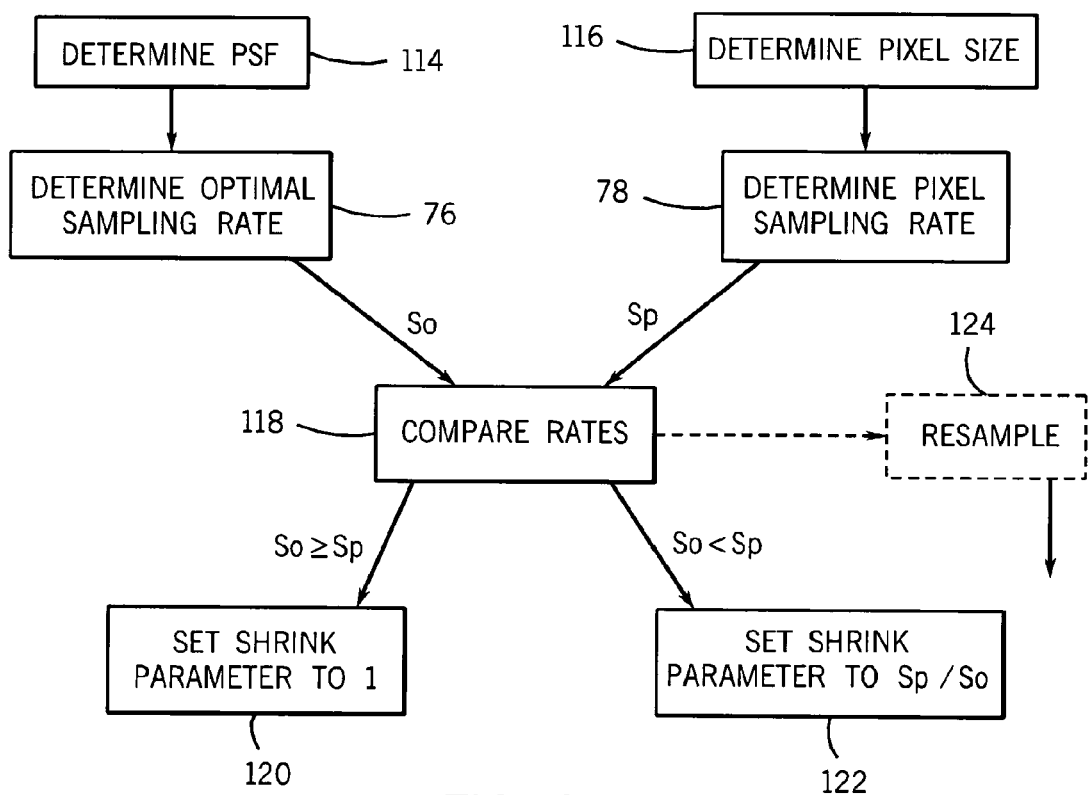
FIG. 6 is a flow chart illustrating exemplary steps in logic for providing resolution adaptive image filtering in accordance with the present techniques.

FIG. 6 illustrates certain functional steps in logic for determining the appropriate shrinking or sub-sampling parameters and levels in accordance with the present technique. The process begins with determining the point-spread function of the system as indicated at step 114. As noted above, the point-spread function could be determined from a look-up table or may be calculated. By way of example again, the point-spread function may depend upon such factors as the reconstruction algorithm in CT imaging, the ZIP parameter in MR imaging, or the source-to-detector distance in digital X-ray imaging. From this point-spread function, then, the optimal sampling rate is determined by module 76. Known techniques are available for determining the optimal sampling rate, which may be generally considered the Nyquist rate based upon the point-spread function of the imaging system. Such techniques include use of a modulation transfer function, which employs the magnitude of the frequency response of the point-spread function.

In parallel with this processing, the redundancy metric described above is determined. The redundancy metric is determined as illustrated in FIG. 6 by determining the pixel size (block 116), that is, the physical dimensions of pixels in the reconstructed image. As will be appreciated by those skilled in the art, this determination is based upon the display field of view and the image size, in pixels, and results in a metric having units of length (typically millimeters). The module 76, then, determines the pixel sampling rate from the pixel size. The sampling rate may generally be considered to be the inverse of the pixel size, resulting in a quantity measured in cycles per unit length.

The optimal sampling rate, which may be denoted $S_o$, and the pixel sampling rate, which may be denoted $S_p$ are then compared as indicated at step 118. In general, it is preferred that the pixel sampling rate be at most the value of the optimal sampling rate. Thus, based upon the comparison at step 118, the optimal or desired shrink or sub-sampling parameter is determined. In a present implementation, as represented in FIG. 6, if the value of $S_o$ is greater than or equal to the actual sampling rate $S_p$, the shrink parameter is set to a value of unity (block 120). That is, the image is already sampled at a rate lower than the optimal sampling rate so any additional shrinking or sub-sampling will yield under sampling. On the contrary, if the optimal sampling rate is less than the pixel sampling rate, the shrink or sub-sampling parameter is set to the value of $S_p/S_o$ (block 122). That is, the image is sampled at a higher rate than the optimal rate, such that additional sampling can be done without losing image information. The value of $S_p/S_o$ may be considered in the present context, the redundancy metric. The resulting parameter is then used in the processing described above for shrinking or sub-sampling the input image for filtering.

It should be noted that in certain context, it may be possible to re-sample the image data based upon raw or pre-processed data. This possibility is indicated at step 124 in FIG. 6. By way of example, if the redundancy metric is found to be greater than 1, it may be possible to interpolate based upon the input image, such as in a frequency domain or other domain. Thus, the raw image data may be reprocessed, such as in case base for MRI data or Radon space for CT data to provide the desired sampling rate matching the optimal sampling rate.

Although the current invention is described as an application to filter parameter adjustments, other applications are also possible. For example, the redundancy metric can be used to alert the operator of a data acquisition system that sub-optimal data is being acquired. As another example, the redundancy metric can be used to set optimal display parameters for the image data. In another example, redundancy metric can be used to guide quantitation of images. In yet another example, redundancy metric can be used to set the parameters of image analysis.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for producing an image from image data comprising:
    accessing stored image data from a memory, the image data defining an input image acquired using an imaging system;
    determining a pixel sampling rate for the image data using an image processing circuit;
    determining a desired sampling rate using the image processing circuit, wherein the desired sampling rate is determined based at least partially on a point-spread function of the imaging system or the frequency content of the image data;
    comparing the pixel sampling rate to the desired sampling rate using the image processing circuit; and
    based upon the comparison, using the image processing circuit to process the image data by shrinking the input image if the pixel sampling rate is greater than the desired sampling rate.

2. The method of claim 1, wherein the desired sampling rate is a Nyquist rate of sampling for the image.

3. The method of claim 1, wherein the pixel sampling rate is determined based upon a display field of view and a size of pixels in the field of view.

4. The method of claim 1, wherein shrinking the input image is at least partially based upon a shrink parameter.

5. The method claim 4, wherein the shrink parameter is a ratio of the pixel sampling rate to the desired sampling rate.

6. The method of claim 1, wherein processing the image data does not comprise shrinking the input image if the pixel sampling rate is less than the desired sampling rate.

7. A method for producing an image from image data comprising:
    accessing stored image data from a memory, the stored image data defining an input image previously acquired by an imaging system using a first pixel sampling rate;
    determining a point-spread function of the imaging system;
    using an image processing circuit to determine a second pixel sampling rate for the image data based at least partially on a modulation transfer function employing a magnitude of a frequency response of the point-spread function, wherein the second sampling rate is a desired sampling rate;
    calculating a shrink parameter as a ratio of the first pixel sampling rate to the desired sampling rate using the image processing circuit; and
    processing the image data using the image processing circuit to shrink the input image defined by the image data based at least partially on the shrink parameter if the shrink parameter is greater than one.

8. The method of claim 7, wherein shrinking the input image defined by the image data is further based upon a redundancy metric determined based upon a display field of view and a size of pixels in the field of view.

9. The method of claim 8, wherein processing the image data further comprises resampling the image data.

10. The method of claim 9, wherein the image data is resampled to match the desired sampling rate.

11. The method of claim 7, wherein the desired sampling rate is a Nyquist rate of sampling for the image.

12. The method of claim 7, wherein processing the image data does not comprise shrinking the input image defined by the image data if the shrink parameter is less than one.

13. A system for processing image data, the system comprising:
    a memory circuit for storing image data, the image data defining an input image acquired by an image data acquisition system at a first pixel sampling rate; and
    a processing circuit for accessing the image data from the memory circuit, determining a second pixel sampling rate for the image data based at least partially on a modulation transfer function employing a magnitude of a frequency response of a point-spread function of the image data acquisition system, wherein the second pixel sampling rate is a desired sampling rate, calculating a shrink parameter as a ratio of the first pixel sampling rate to the desired sampling rate, and processing the image data by shrinking the input image defined by the image data based at least partially on the shrink parameter if the shrink parameter is greater than one.

14. The system of claim 13, wherein shrinking the input image defined by the image data is further based upon a redundancy metric determined based upon a display field of view and a size of pixels in the field of view.

15. The system of claim 14, wherein the processing circuit is further configured to process the image data by resampling the image data.

16. The system of claim 15, wherein the image data is resampled to match the desired sampling rate.

17. The system of claim 13, wherein the image data acquisition system is selected from a group consisting of a CT system, an MRI system, an ultrasound system, an X-ray system, a tomosynthesis system, and a PET system.

18. The system of claim 13, wherein the processing circuit is configured to not shrink the input image defined by the image data if the shrink parameter is less than one.

19. A system for producing an image from image data comprising:
    means for accessing stored image data from a memory, the image data defining an input image acquired using an imaging system;
    means for determining a pixel sampling rate for the image data;

means for determining a desired sampling rate, wherein the desired sampling rate is determined based at least partially on a point-spread function of the imaging system or the frequency content of the image data;

means for comparing the pixel sampling rate to the desired sampling rate;

means for determining a shrink parameter based upon the comparison; and means for processing the image data by shrinking the input image if, based upon the comparison, the pixel sampling rate is greater than the desired sampling rate.

20. A system for producing an image from image data comprising:

means for accessing stored image data from a memory, the stored image data defining an input image previously acquired by an imaging system using a first pixel sampling rate;

means for determining a point-spread function of the imaging system;

means for determining a second pixel sampling rate for the image data based at least partially on a modulation transfer function employing a magnitude of a frequency response of the point-spread function, wherein the second pixel sampling rate is a desired sampling rate;

means for calculating a shrink parameter as a ratio of the first pixel sampling rate to the desired sampling rate; and means for processing the image data by shrinking the image defined by the image data based at least partially on the shrink parameter if the shrink parameter is greater than one.

21. A computer readable medium storing a computer program for producing an image from image data comprising:

code stored on the computer readable medium encoding routines for accessing stored image data defining an input image from a memory, determining a pixel sampling rate for the image data, determining a desired sampling rate, comparing the pixel sampling rate to the desired sampling rate and, based upon the comparison, processing the image data by shrinking the input image if the pixel sampling rate is greater than the desired sampling rate;

wherein the desired sampling rate is determined based at least partially on a point-spread function of the imaging system or the frequency content of the image data.

22. A computer readable medium storing a computer program for producing an image from image data comprising:

code stored on the computer readable medium encoding routines for accessing stored image data from a memory, the stored image data defining an input image previously acquired by an imaging system using a first pixel sampling rate, determining a point-spread function of the imaging system, determining a second pixel sampling rate for the image data based at least partially on a modulation transfer function employing a magnitude of a frequency response of the point-spread function, the second pixel rate being a desired sampling rate, calculating a shrink parameter as a ratio of the first pixel sampling rate to the desired sampling rate, and processing the image data by shrinking the image defined by the image data based at least partially on the shrink parameter if the shrink parameter is greater than one.

* * * * *

UNITED STATES PATENT AND TRADEMARK OFFICE
CERTIFICATE OF CORRECTION

PATENT NO. : 7,590,306 B2 Page 1 of 1
APPLICATION NO. : 10/723791
DATED : September 15, 2009
INVENTOR(S) : Lal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1693 days.

Signed and Sealed this

Twenty-first Day of September, 2010

David J. Kappos
*Director of the United States Patent and Trademark Office*